(12) United States Patent
Shiohama et al.

(10) Patent No.: US 10,998,593 B2
(45) Date of Patent: May 4, 2021

(54) BATTERY COVER (71) Applicants: Yazaki Corporation, Tokyo (JP);
TOYOTA JIDOSHA KABUSHIKI
KAISHA, Toyota (JP)

(72) Inventors: Takahiro Shiohama, Makinohara (JP);
Tatsuya Aoki, Makinohara (JP);
Ryouzou Hikosaka, Toyota (JP);
Takuma Shimamura, Nisshin (JP);
Kengo Sato, Toyota (JP)

(73) Assignees: YAZAKI CORPORATION, Tokyo
(JP); TOYOTA JIDOSHA
KABUSHIKI KAISHA, Toyota (JP)

(*) Notice: Subject to any disclaimer, the term of this
patent is extended or adjusted under 35
U.S.C. 154(b) by 0 days.

(21) Appl. No.: 16/352,139

(22) Filed: Mar. 13, 2019

(65) Prior Publication Data
US 2019/0288249 A1 Sep. 19, 2019

(30) Foreign Application Priority Data

Mar. 14, 2018 (JP) .............................. JP2018-046384
Dec. 4, 2018 (JP) .............................. JP2018-227297

(51) Int. Cl.
*H01M 2/04* (2006.01)
*H01M 50/147* (2021.01)
*H01R 11/28* (2006.01)
*H01M 50/10* (2021.01)
*H01M 50/20* (2021.01)
*H01M 50/24* (2021.01)
*H01M 50/543* (2021.01)
*H01M 50/552* (2021.01)
*H01M 50/598* (2021.01)

(52) U.S. Cl.
CPC ......... *H01M 50/147* (2021.01); *H01M 50/10*
(2021.01); *H01M 50/20* (2021.01); *H01M
50/24* (2021.01); *H01M 50/543* (2021.01);
*H01M 50/561* (2021.01); *H01M 50/598*
(2021.01); *H01R 11/284* (2013.01); *H01M
2220/20* (2013.01)

(58) Field of Classification Search
CPC .... H01M 2/043; H01M 2/305; H01M 2/1094;
H01M 2/344; H01M 2/307; H01M
2/1022; H01M 2/024; H01M 2220/20;
H01M 2200/103; H01M 2/348; H01M
2/0404; H01R 11/284
See application file for complete search history.

(56) References Cited

U.S. PATENT DOCUMENTS

| 4,698,459 A | 10/1987 | Drake | |
|---|---|---|---|
| 2002/0168566 A1* | 11/2002 | Ohtsuka | H01R 11/284 429/175 |
| 2016/0006003 A1 | 1/2016 | Ohashi et al. | |

FOREIGN PATENT DOCUMENTS

| EP | 1 056 157 A2 | 11/2000 |
|---|---|---|
| JP | 2016-015231 A | 1/2016 |

* cited by examiner

*Primary Examiner* — Cynthia K Walls
(74) *Attorney, Agent, or Firm* — Sughrue Mion, PLLC (57) ABSTRACT

A battery cover including a main body, an opening/closing part provided on the main body, a flexible rib having a locking projection provided on the opening/closing part, an abutting rib provided on the main body, which has a locking recess to be engaged with the locking projection while the opening/closing part is opened to the main body, a contact portion that abuts on the locking projection and deflects the flexible rib when the opening/closing part is opened to the main body, and a flat portion provided on the contact portion, which abuts on the locking projection first when the opening/closing part is opened to the main body and extends in the direction orthogonal to the direction of force input when abutting on the locking projection.

6 Claims, 10 Drawing Sheets

BATTERY COVER

BACKGROUND

1. Technical Field

The present invention relates to a battery cover. In particular, the present invention relates to a battery cover capable of maintaining an opening state of an opening/closing part provided on a main body to be assembled to a battery. The opening/closing part is formed to be openable and closable.

2. Related Art

In JP 2016-15231 A, there is proposed a battery cover including a main body to be assembled to a battery, an opening/closing part provided on the main body via a hinge, which is openable and closable, a locking piece serving as a flexible rib having a locking projection, which is provided on the opening/closing part to be deflectable, a locking frame serving as an abutting rib having a locking recess to be engaged with the locking projection in a state where the opening/closing part is opened with respect to the main body, which is provided on the main body, and a locking edge serving as a contact portion that abuts on the locking projection and deflects the locking piece at the time when the opening/closing part is opened with respect to the main body, which is provided on the locking frame.

In this battery cover, when the opening/closing part is opened with respect to the main body, the locking piece is deflected while the locking projection of the locking piece slides on the locking edge of the locking frame, and when the sliding between the locking projection and the locking edge is complete, the locking piece is restored and the locking projection is engaged with the locking recess of the locking frame, thereby maintaining the opening state of the opening/closing part with respect to the main body.

SUMMARY

Incidentally, in the battery cover as described above, the contact portion of the abutting rib that abuts on the locking projection of the flexible rib first when the opening/closing part is opened with respect to the main body is formed in a curved shape.

Accordingly, when the locking projection abuts on the contact portion in the curved shape, the locking projection slides along the curved surface, whereby there has been a possibility that the locking projection and the locking recess are not engaged with each other and the opening state of the opening/closing part may not be maintained.

The present invention has been conceived to solve the problem described above, and an object of the present invention is to provide a battery cover capable of stably maintaining an opening state of an opening/closing part.

A battery cover according to an embodiment of the present invention includes a main body to be assembled to a battery, an opening/closing part provided on the main body via a hinge to be openable and closable, a flexible rib provided on the opening/closing part to be deflectable which has a locking projection, an abutting rib provided on the main body, which has a locking recess to be engaged with the locking projection in a state where the opening/closing part is opened with respect to the main body, a contact portion that abuts on the locking projection and deflects the flexible rib when the opening/closing part is opened with respect to the main body, which is provided on the abutting rib, and a flat portion that abuts on the locking projection first when the opening/closing part is opened with respect to the main body and extends in the direction orthogonal to the direction of force input at the time of abutting on the locking projection, which is provided on the contact portion.

The battery cover according to an embodiment of the present invention may be characterized in that a contact tapered portion that slides on the locking projection when the opening/closing part is opened with respect to the main body, which is formed to be inclined between the flat portion and the locking recess, is formed on the contact portion.

The battery cover according to an embodiment of the present invention may be characterized in that a projecting tapered portion that abuts on the contact tapered portion when the locking projection and the flat portion are brought into contact with each other is formed on the side of the contact portion of the locking projection.

The battery cover according to an embodiment of the present invention may be characterized in that a projection is provided on the main body, which includes a sliding surface that slides on the locking projection to guide the locking projection to the contact portion when the opening/closing part is opened with respect to the main body, and regulates sliding of the locking projection on the flat portion.

The battery cover according to an embodiment of the present invention may be characterized in that the projection is formed on the abutting rib.

The battery cover according to an embodiment of the present invention may be characterized in that a contact surface is provided on the main body, which abuts on a contact object surface formed on the opening/closing part and maintains the opening state of the opening/closing part with respect to the main body in the state where the locking projection and the locking recess are engaged with each other.

According to the present invention, a battery cover capable of stably maintaining an opening state of an opening/closing part can be provided.

DETAILED DESCRIPTION

A battery cover according to embodiments of the present invention will be described with reference to FIGS. 1 to 13.

First Embodiment

A first embodiment will be described with reference to FIGS. 1 to 9.

A battery cover 1 according to the present embodiment includes a main body 5 to be assembled to a battery 3, an opening/closing part 9 provided on the main body 5 via a hinge 7, which is openable and closable, a flexible rib 13 having a locking projection 11, which is provided on the opening/closing part 9 to be deflectable, an abutting rib 17 having a locking recess 15 to be engaged with the locking projection 11 in a state where the opening/closing part 9 is opened with respect to the main body 5, which is provided on the main body 5, and a contact portion 19 to abut on the locking projection 11 and to deflect the flexible rib 13 at the time when the opening/closing part 9 is opened with respect to the main body 5, which is provided on the abutting rib 17.

Besides, the contact portion 19 includes a flat portion 21 that abuts on the locking projection 11 first when the opening/closing part 9 is opened with respect to the main body 5 and extends in the direction orthogonal to the direction of force input at the time of abutting on the locking projection 11.

Note that, while it is mentioned in the description above that it abuts on the locking projection 11 "first" when the opening/closing part 9 is opened with respect to the main body 5, it means that the "locking projection 11" abuts on the "contact portion 19" "first", in other words, the "flat portion 21" is formed at the position on the "contact portion 19" that abuts on the "locking projection 11" "first".

Further, the contact portion 19 includes a contact tapered portion 23 formed between the flat portion 21 and the locking recess 15 in an inclined manner, which slides on the locking projection 11 when the opening/closing part 9 is opened with respect to the main body 5.

Furthermore, a projecting tapered portion 25 that abuts on the contact tapered portion 23 when the locking projection 11 and the flat portion 21 are brought into contact with each other is formed on the side of the contact portion 19 of the locking projection 11.

As illustrated in FIGS. 1 to 7, the battery 3 is formed in a rectangular parallelepiped shape, and has a recessed part 27 formed in such a manner that a corner portion of the upper surface is cut out to be one stage lower than the upper surface.

A battery post 29 is projected in the recessed part 27, and a fuse unit 31 is connected to the battery post 29.

The fuse unit 31 is formed in such a manner that a fuse element (not illustrated) made of a conductive material provided with a fuse to be blown by overcurrent is molded with a synthetic resin.

The fuse unit 31 is connected to a cable 33 connected to various devices mounted on a vehicle or the like, and the power from the battery 3 is supplied to the various devices or the like.

At this time, when overcurrent is input to the fuse element, the fuse is blown and interrupts the power supply between the battery 3 and the various devices or the like.

The battery cover 1 is arranged to cover the outer circumference of the fuse unit 31, whereby the fuse unit 31, the battery post 29, and the like are protected by the battery cover 1.

The battery cover 1 is made of an insulating material such as a synthetic resin, and includes the main body 5 and the opening/closing part 9.

The main body 5 is formed in the L shape to cover the periphery of the fuse unit 31 and to be arranged on the side surface of the battery 3, which is arranged in the recessed part 27 of the battery 3, and is fixed to the fuse unit 31 via an engaging means (not illustrated).

The opening/closing part 9 is provided on the main body 5 via the hinge 7 to be openable and closable to rotate toward the upper side of the battery 3.

The opening/closing part 9 covers the upper surface side of the fuse unit 31, and opens with respect to the main body 5, whereby the fuse can be checked and the fuse unit 31 can be detached from the battery post 29 in the state where the battery cover 1 is assembled to the fuse unit 31, for example.

Such an opening state of the opening/closing part 9 with respect to the main body 5 is maintained by engagement between the locking projection 11 formed on the flexible rib 13 and the locking recess 15 formed on the abutting rib 17.

The flexible rib 13 which is a deflectable member continuous with the opening/closing part 9 is provided on the side of the hinge 7 of the opening/closing part 9, and on both sides in the rotation axis direction of the hinge 7.

On the flexible rib 13, the locking projection 11 is projected outward in the rotation axis direction of the hinge 7.

The abutting rib 17 which is a member continuous with the main body 5 and overlaps the locking projection 11 and the opening/closing part 9 in the rotation direction is provided on the side of the hinge 7 of the main body 5, and on both sides in the rotation axis direction of the hinge 7 outside the flexible rib 13 in the rotation axis direction of the hinge 7.

The flexible rib 13 is arranged on the abutting rib 17 to face the rotation axis direction of the hinge 7 in the state where the opening/closing part 9 is opened with respect to the main body 5, and the locking recess 15 to be engaged with the locking projection 11 is formed on the abutting rib 17 at the position corresponding to the locking projection 11.

By the locking projection 11 and the locking recess 15 being engaged with each other, the opening/closing part 9 is not closed with respect to the main body 5 due to restorative force of the hinge 7 or the like so that the opening state of the opening/closing part 9 with respect to the main body 5 can be maintained, whereby maintenance work of the fuse unit 31 can be favorably carried out.

The locking projection 11 to be engaged with the locking recess 15 abuts on the contact portion 19 of the abutting rib 17 according to the opening operation of the opening/closing part 9, deflects the flexible rib 13, and is engaged with the locking recess 15 using the restorative force of the flexible rib 13 when the locking projection 11 is positioned at the locking recess 15.

The contact portion 19 includes the flat portion 21 and the contact tapered portion 23.

The flat portion 21 is formed on the upper surface of the abutting rib 17 that overlaps the locking projection 11 in the rotation direction of the opening/closing part 9, and abuts on the locking projection 11 first when the opening/closing part 9 is opened with respect to the main body 5.

The flat portion 21 is formed in a straight line extending in the direction orthogonal to the direction of the force input at the time of abutting on the locking projection 11.

Specifically, the flat portion 21 is formed in the straight line passing through the center of the rotation path of the locking projection 11 (not illustrated) drawn by the opening/closing operation of the opening/closing part 9 and a contact P between the flat portion 21 and the locking projection 11.

By forming the flat portion 21 in this manner, when the locking projection 11 abuts on the flat portion 21, the force is input from the locking projection 11 in the direction perpendicular to the flat portion 21, whereby sliding of the locking projection 11 caused by dispersion of the force at the flat portion 21 input from the locking projection 11 can be suppressed.

Accordingly, the flexible rib 13 can be stably deflected by the locking projection 11 and the flat portion 21 being in contact with each other, whereby the locking projection 11 and the locking recess 15 can be reliably engaged with each other.

Therefore, with such a battery cover 1, the locking projection 11 and the locking recess 15 can be reliably engaged with each other, whereby the opening state of the opening/closing part 9 can be stably maintained.

The contact tapered portion 23 is formed on the upper surface side of the side surface of the abutting rib 17, and is formed between the flat portion 21 and the locking recess 15 in an inclined manner such that a slope inclined downward from the flat portion 21 toward the locking recess 15 is formed.

The contact tapered portion 23 slides on the locking projection 11 when the opening/closing part 9 is opened with respect to the main body 5, and deflects the flexible rib 13 along the contact tapered portion 23.

With the contact tapered portion 23 being provided, the flexible rib 13 can be stably deflected, whereby the locking projection 11 and the locking recess 15 can be more reliably engaged with each other.

That is, in the battery cover 1, since the contact portion 19 includes the contact tapered portion 23 formed between the flat portion 21 and the locking recess 15 in an inclined manner, which slides on the locking projection 11 when the opening/closing part 9 is opened with respect to the main body 5, the flexible rib 13 can be stably deflected according to the opening operation of the opening/closing part 9, whereby the locking projection 11 and the locking recess 15 can be stably engaged with each other.

Here, on the side of the contact portion 19 of the locking projection 11, the projecting tapered portion 25 inclined at the inclination same as that of the contact tapered portion 23 is formed.

The projecting tapered portion 25 abuts on the contact tapered portion 23 when the locking projection 11 and the flat portion 21 are brought into contact with each other.

By the projecting tapered portion 25 to be in contact with the contact tapered portion 23 being formed in this manner, when the locking projection 11 and the flat portion 21 are brought into contact with each other, the contact tapered portion 23 and the projecting tapered portion 25 are brought into contact with each other to increase the contact area, whereby sliding of the locking projection 11 at the flat portion 21 can be further suppressed.

In addition, the locking projection 11 can be stably guided to the contact tapered portion 23 according to the opening operation of the opening/closing part 9, whereby deflection of the flexible rib 13 can be stably performed.

As described above, in the battery cover 1, the projecting tapered portion 25 is provided on the side of the contact portion 19 of the locking projection 11, which abuts on the contact tapered portion 23 when the locking projection 11 and the flat portion 21 are brought into contact with each other, whereby the locking projection 11 can be stably guided from the flat portion 21 to the contact tapered portion 23 according to the opening operation of the opening/closing part 9.

Figure 8:
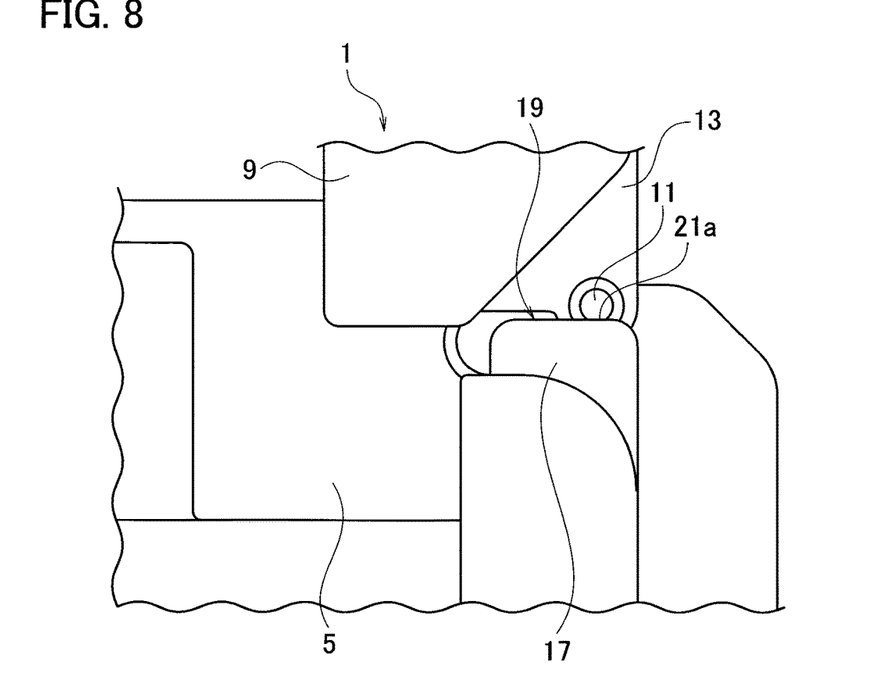
FIG. 8 is an enlarged side view of the main part illustrating a state where the opening/closing part of the battery cover according to the first embodiment of the present invention is opened at a different angle.

In terms of a shape of the flat portion 21, as exemplified in FIG. 8, in a case where an opening angle of the opening/closing part 9 with respect to the main body 5 is 90 degrees, it may be a flat portion 21a formed in a straight line extending in the horizontal direction.

Figure 1:
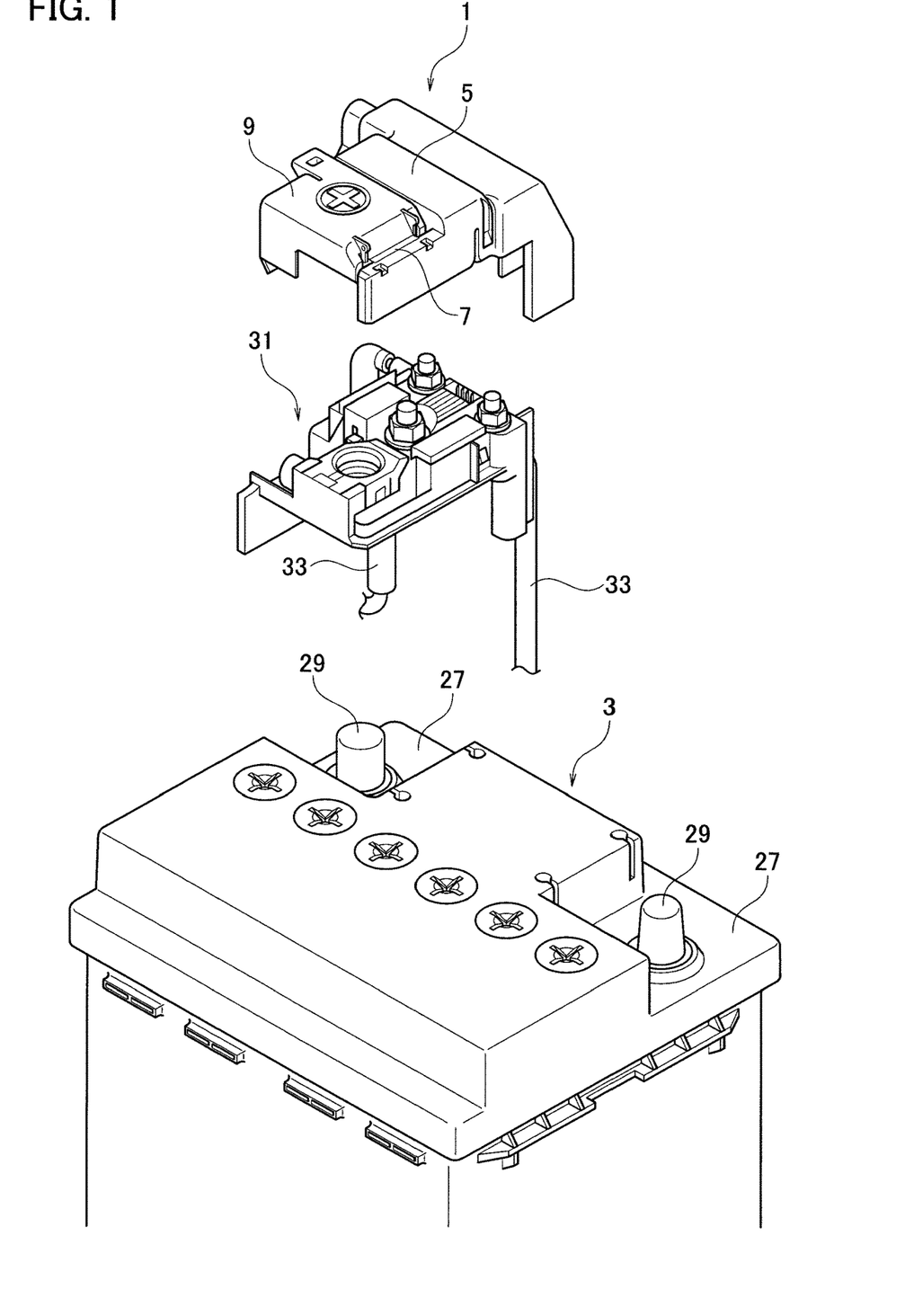
FIG. 1 is a perspective view of a state where a battery cover according to a first embodiment of the present invention is being assembled to a battery.
Figure 2:
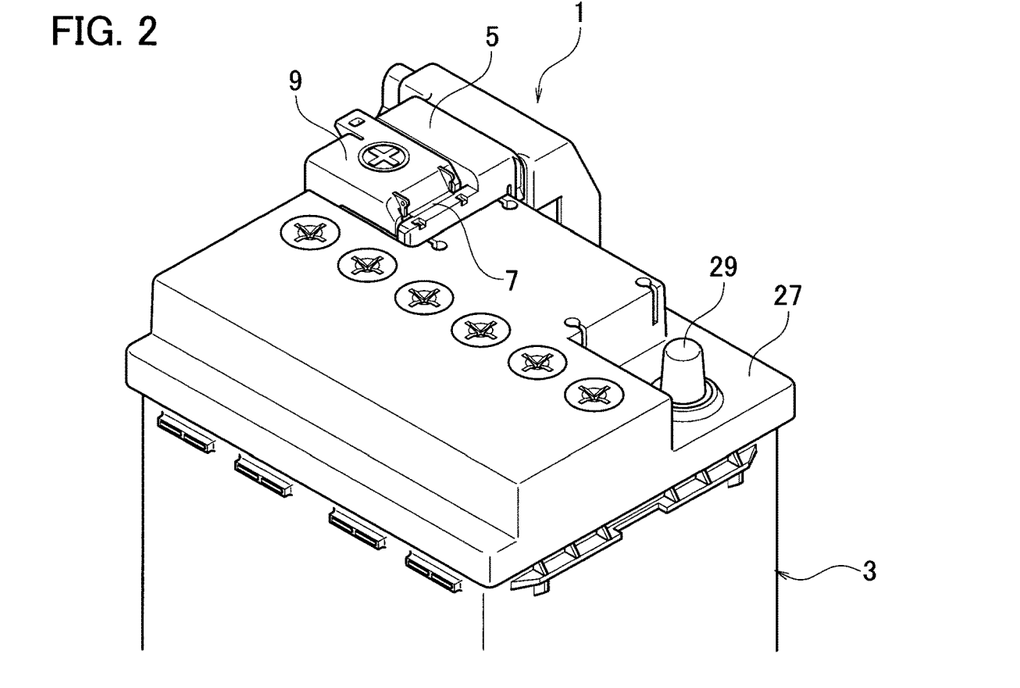
FIG. 2 is a perspective view of a state where the battery cover according to the first embodiment of the present invention is assembled to the battery.
Figure 3:
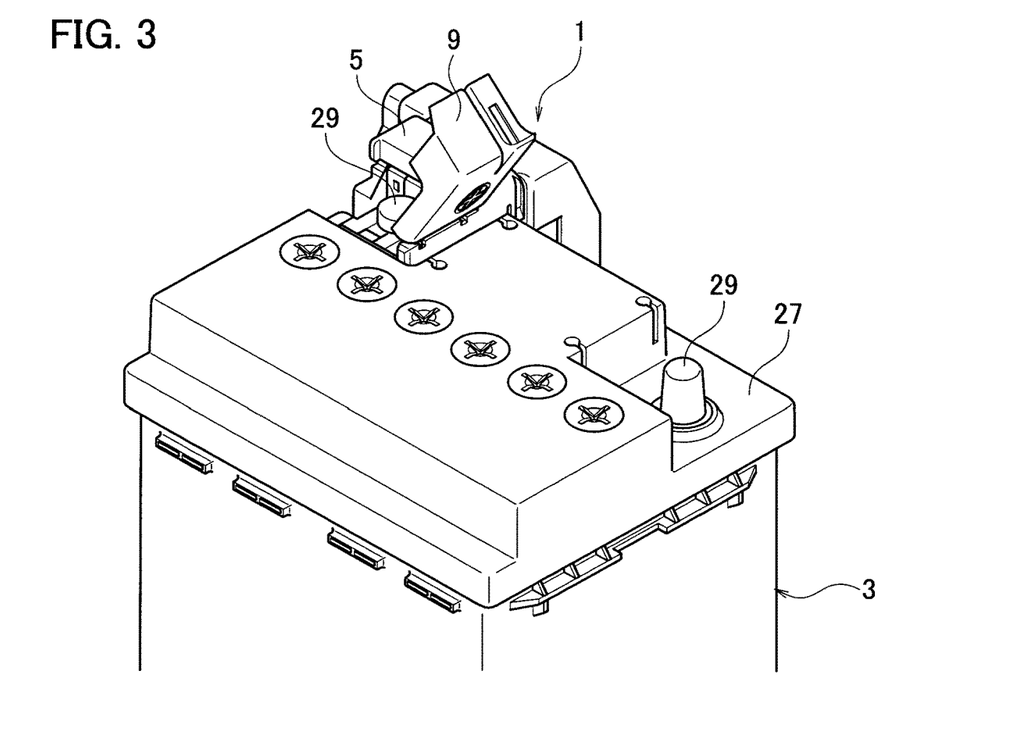
FIG. 3 is a perspective view of a state where an opening/closing part of the battery cover according to the first embodiment of the present invention is opened.
Figure 4:
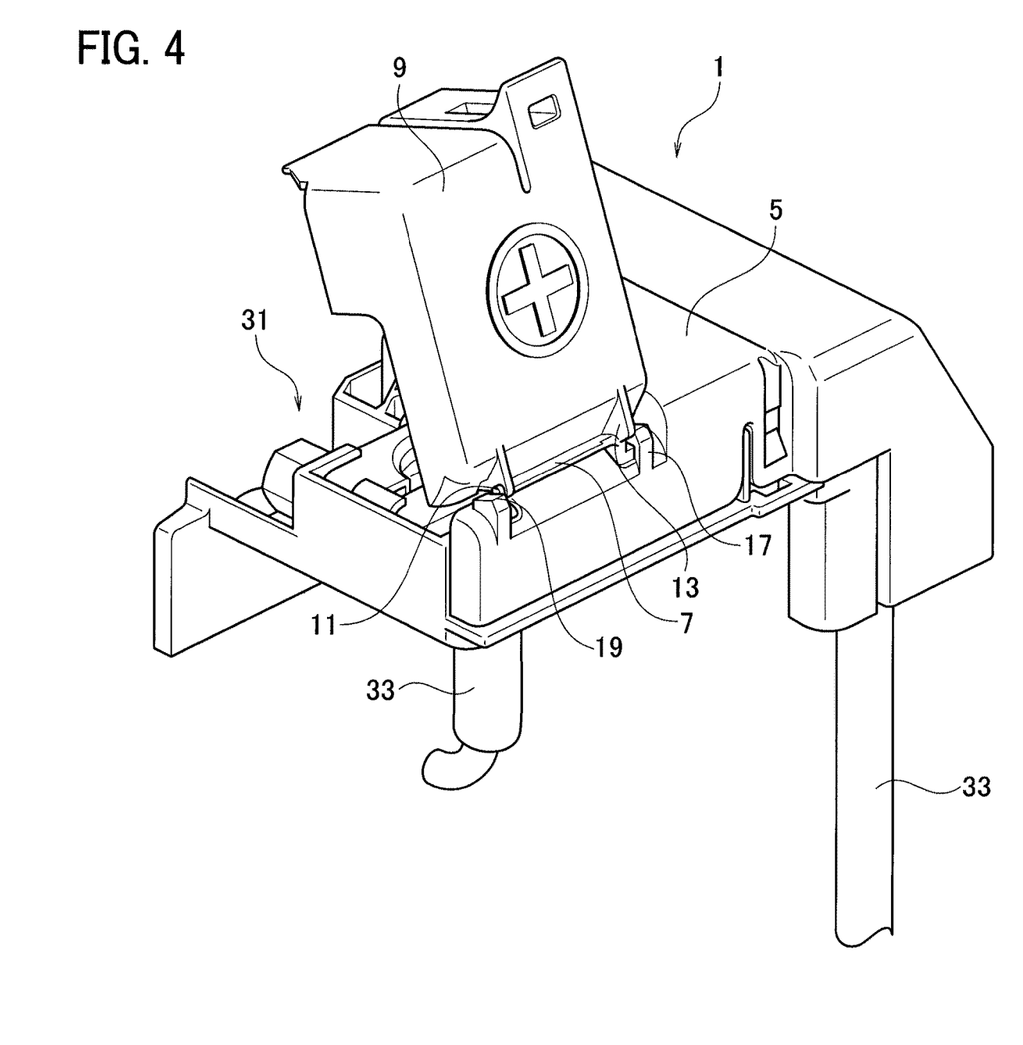
FIG. 4 is another perspective view of the state where the opening/closing part of the battery cover according to the first embodiment of the present invention is opened.
Figure 5:
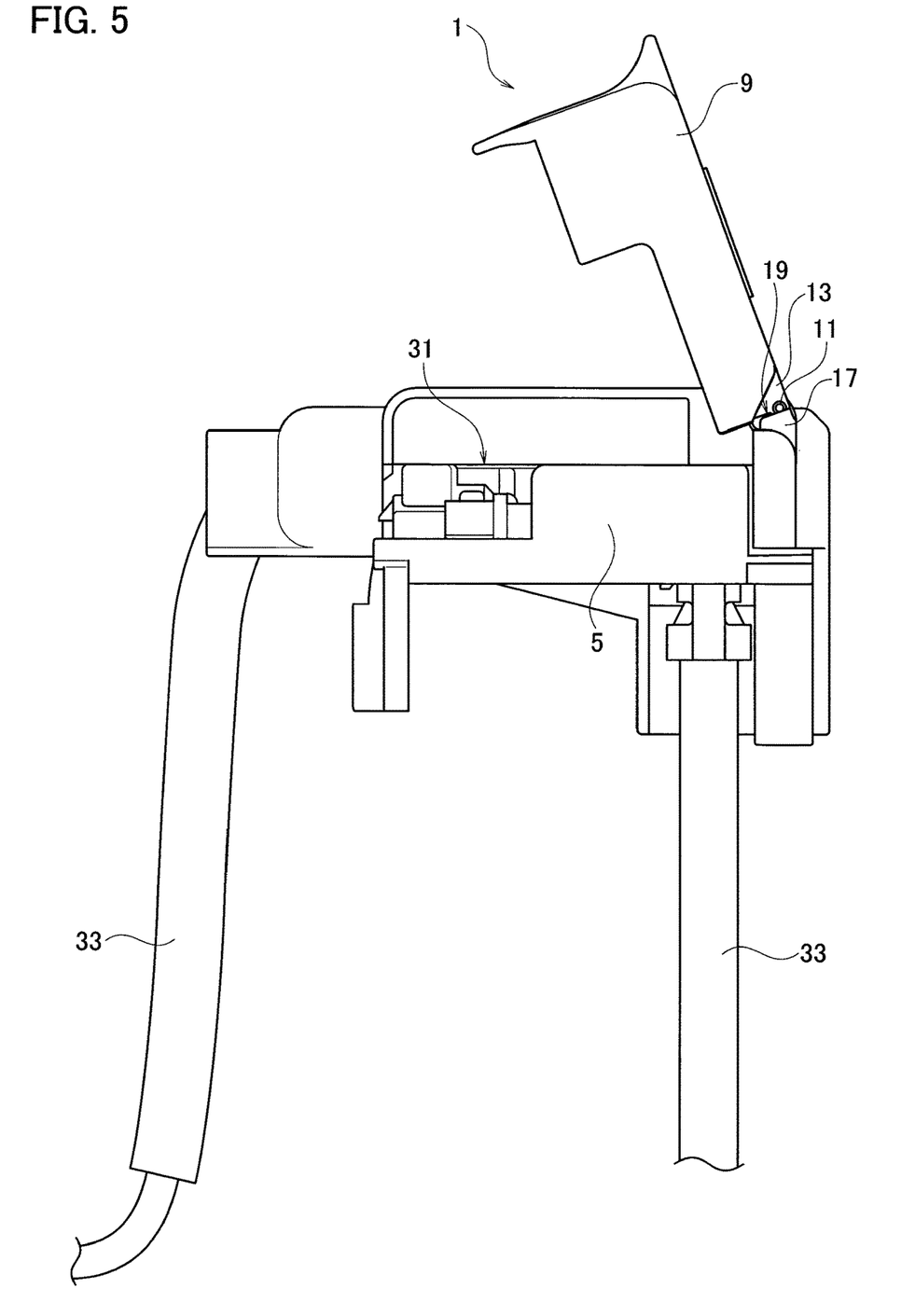
FIG. 5 is a side view of the state where the opening/closing part of the battery cover according to the first embodiment of the present invention is opened.
Figure 6:
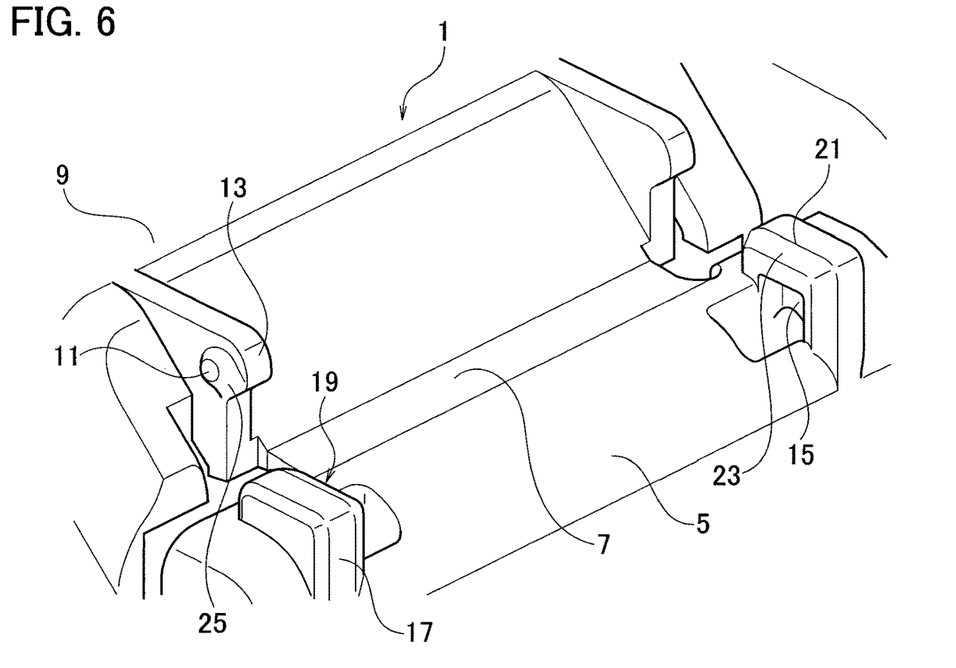
FIG. 6 is an enlarged perspective view of a main part illustrating a state where the opening/closing part of the battery cover according to the first embodiment of the present invention is closed.
Figure 7:
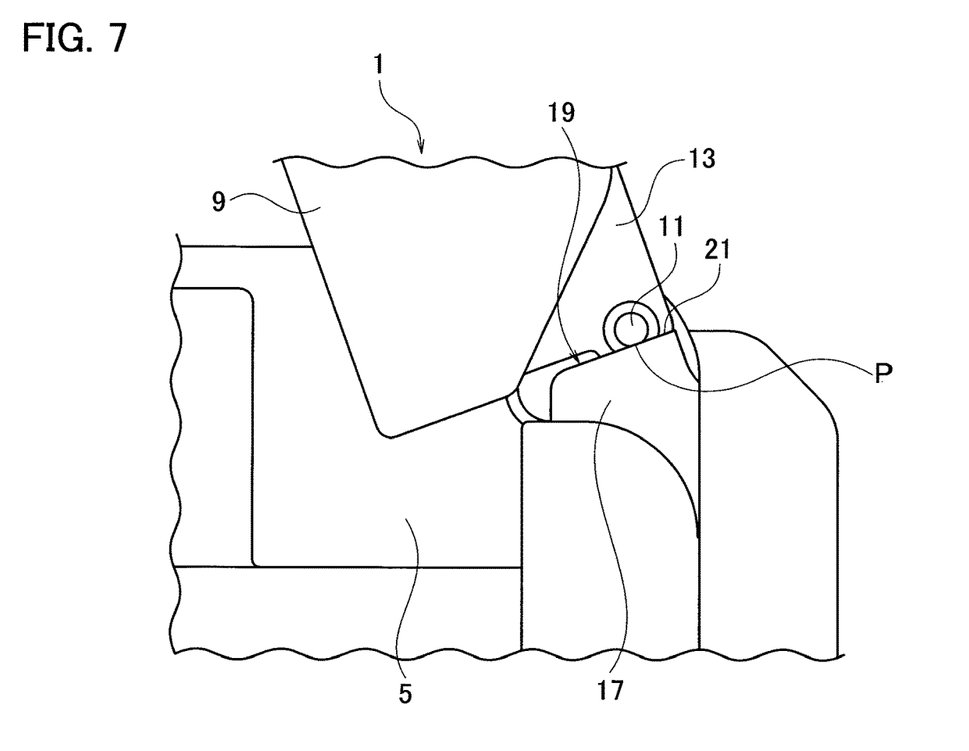
FIG. 7 is an enlarged side view of the main part illustrating the state where the opening/closing part of the battery cover according to the first embodiment of the present invention is opened.
Figure 9:
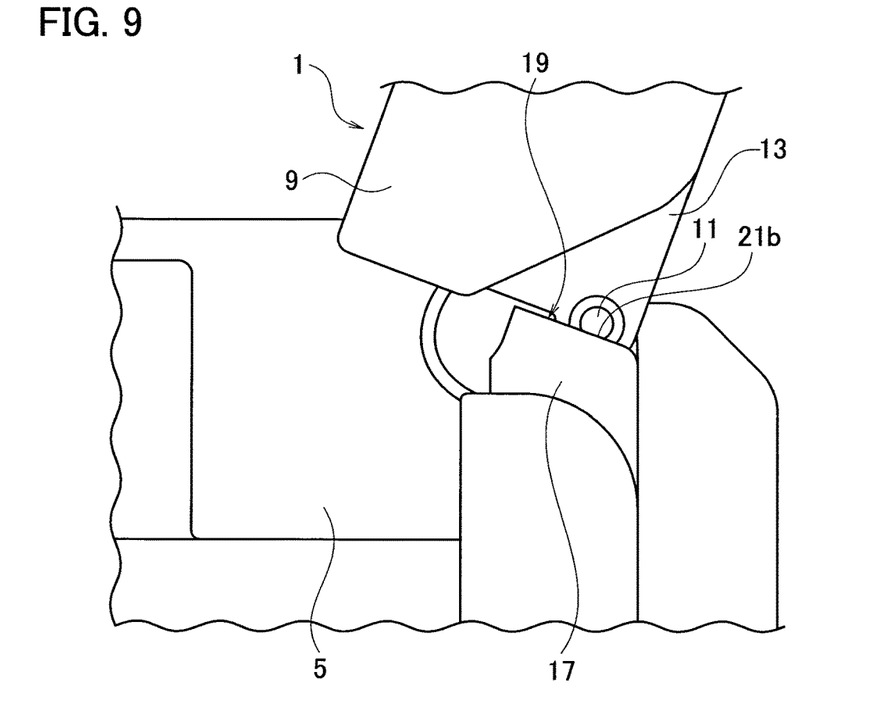
FIG. 9 is another enlarged side view of the main part illustrating the state where the opening/closing part of the battery cover according to the first embodiment of the present invention is opened at a different angle.
Figure 10:
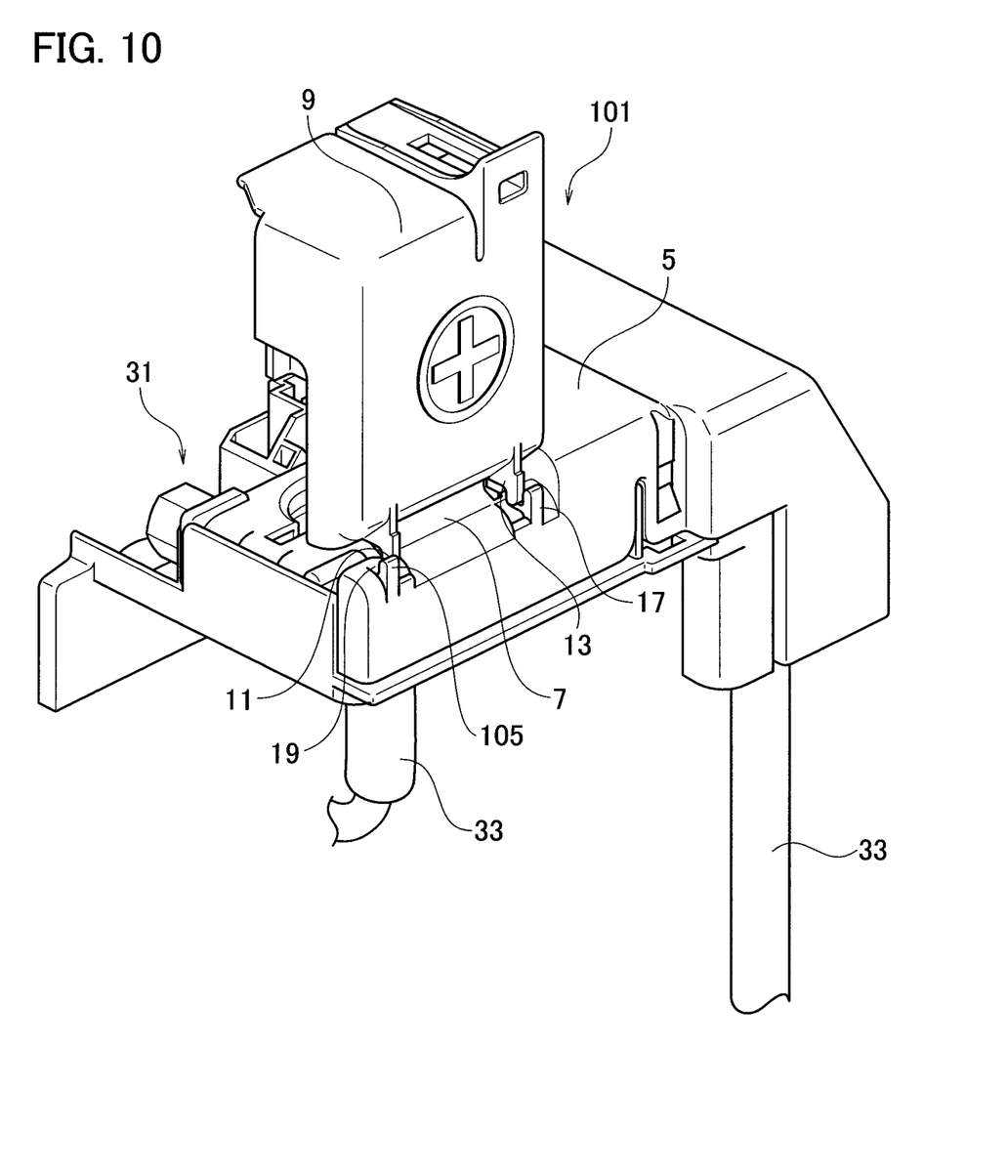
FIG. 10 is a perspective view of a state where an opening/closing part of a battery cover according to a second embodiment of the present invention is opened.
Figure 11:
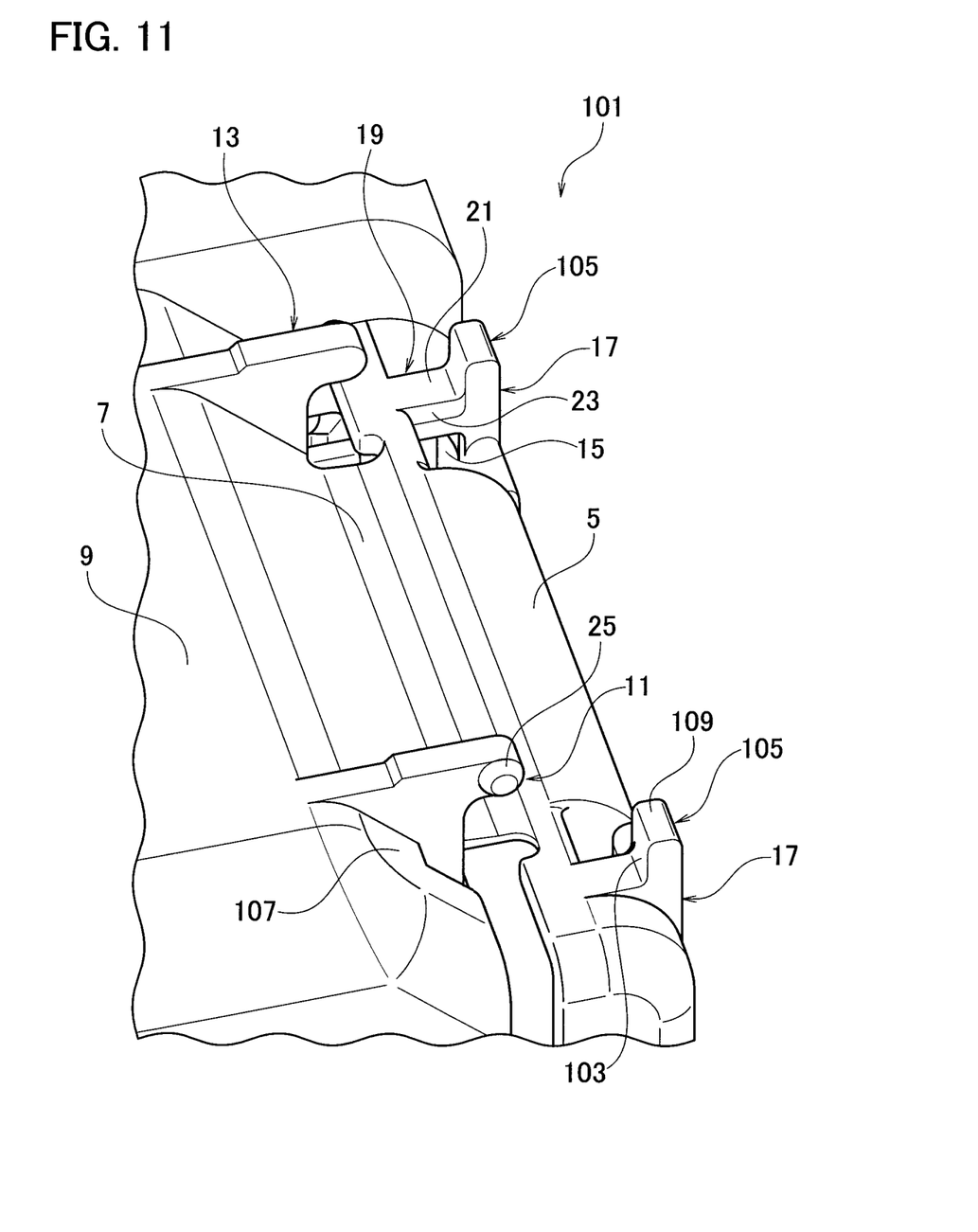
FIG. 11 is an enlarged perspective view of a main part illustrating a state where the opening/closing part of the battery cover according to the second embodiment of the present invention is closed.
Figure 12:
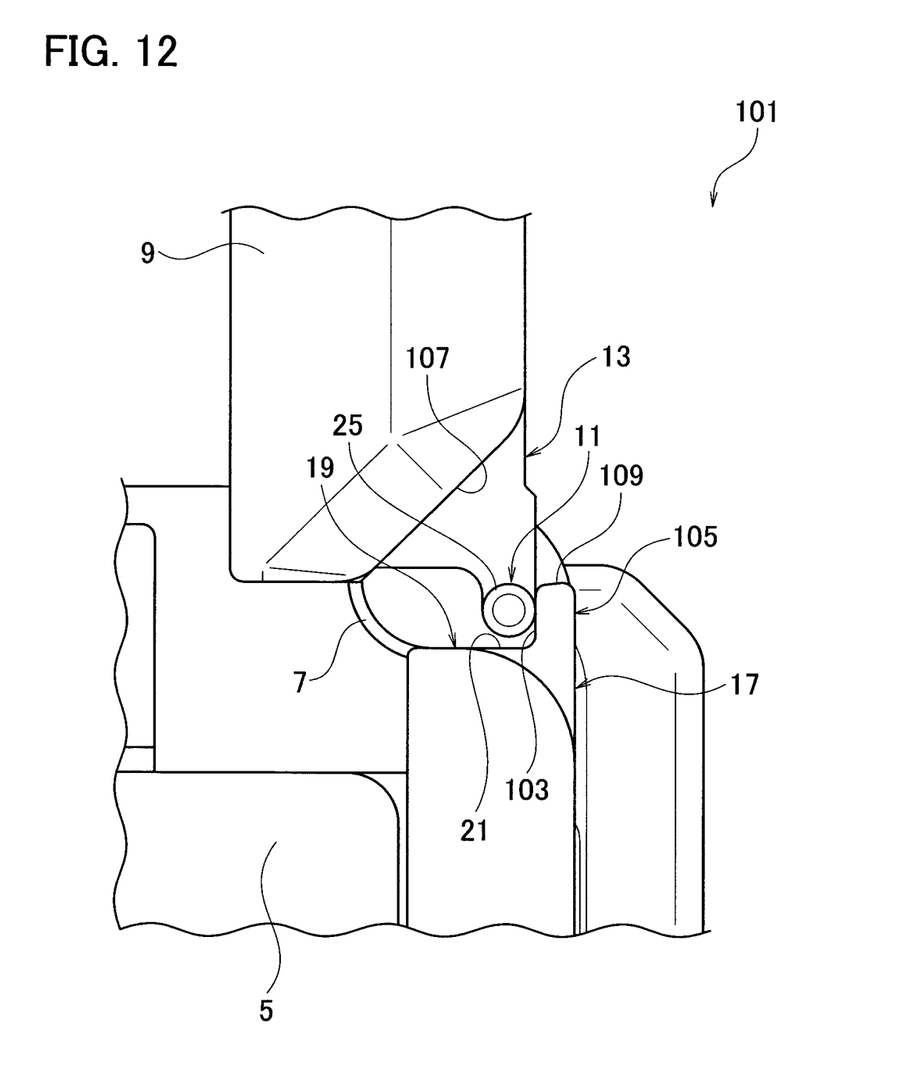
FIG. 12 is an enlarged side view of the main part illustrating a state where the opening/closing part of the battery cover according to the second embodiment of the present invention is being opened.
Figure 13:
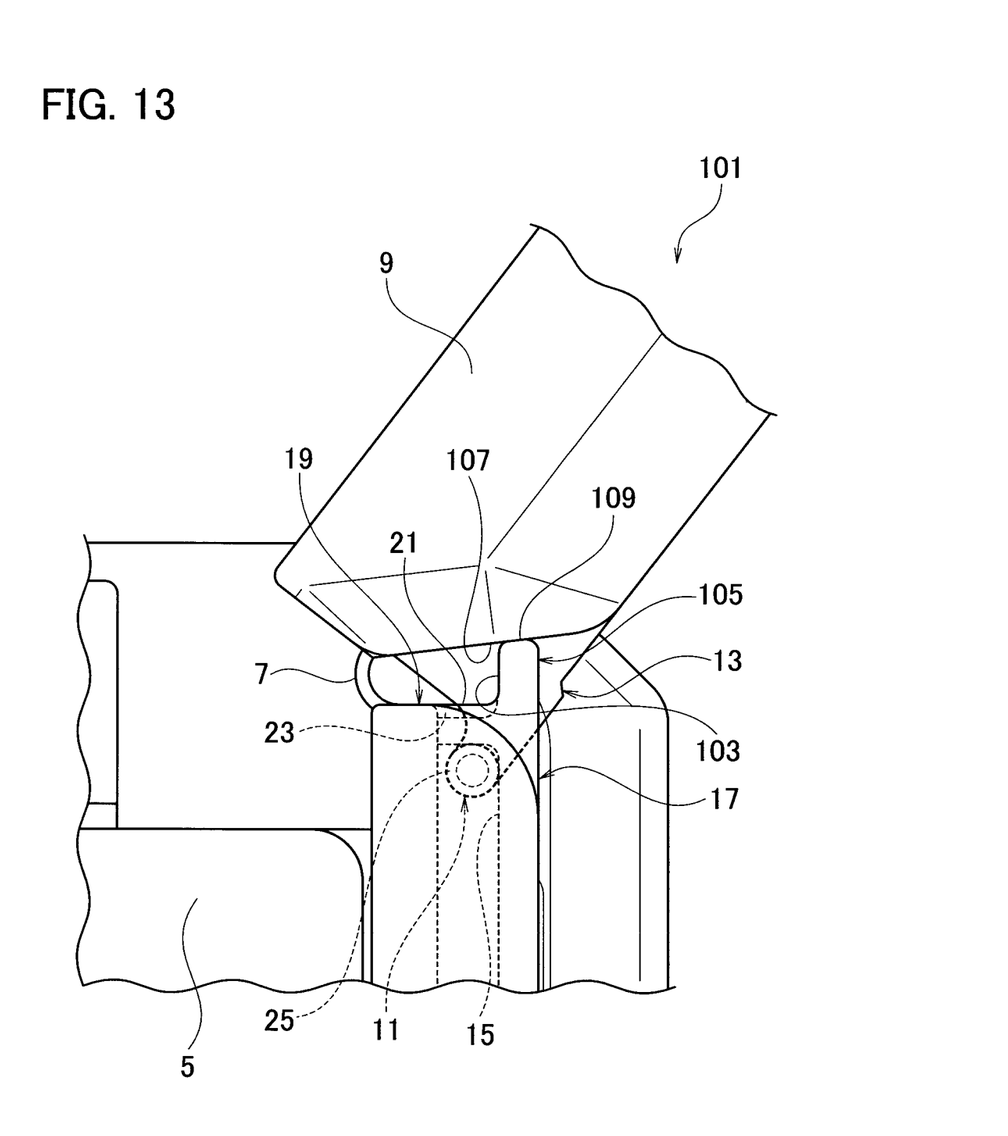
FIG. 13 is an enlarged side view of the main part illustrating the state where the opening/closing part of the battery cover according to the second embodiment of the present invention is opened.

Moreover, as illustrated in FIG. 9, in a case where the opening angle of the opening/closing part 9 with respect to the main body 5 is larger than 90 degrees (in this case, 110 degrees), it may be a flat portion 21b formed in a straight line inclined in the direction opposite to that of the flat portion 21 illustrated in FIG. 7.

In this manner, the flat portion 21 may be selected and formed as appropriate to be formed in the straight line that can receive the force input at the time of abutting on the locking projection 11 in the perpendicular direction according to the opening angle of the opening/closing part 9 with respect to the main body 5.

In such a battery cover 1, the contact portion 19 includes the flat portion 21 that abuts on the locking projection 11 first when the opening/closing part 9 is opened with respect to the main body 5 and extends in the direction orthogonal to the direction of the force input at the time of abutting on the locking projection 11 so that the force applied from the locking projection 11 to the flat portion 21 can be received in the perpendicular direction, whereby sliding of the locking projection 11 at the flat portion 21 can be suppressed.

Accordingly, the flexible rib 13 can be stably deflected by the locking projection 11 and the contact portion 19 being in contact with each other, whereby the locking projection 11 and the locking recess 15 can be reliably engaged with each other.

Therefore, with such a battery cover 1, the locking projection 11 and the locking recess 15 can be reliably engaged with each other, whereby the opening state of the opening/closing part 9 can be stably maintained.

Further, since the contact portion 19 includes the contact tapered portion 23 formed between the flat portion 21 and the locking recess 15 in an inclined manner, which slides on the locking projection 11 when the opening/closing part 9 is opened with respect to the main body 5, the flexible rib 13 can be stably deflected according to the opening operation of the opening/closing part 9, whereby the locking projection 11 and the locking recess 15 can be stably engaged with each other.

Furthermore, the projecting tapered portion 25 is provided on the side of the contact portion 19 of the locking projection 11, which abuts on the contact tapered portion 23 when the locking projection 11 and the flat portion 21 are brought into contact with each other, whereby the locking projection 11 can be stably guided from the flat portion 21 to the contact tapered portion 23 according to the opening operation of the opening/closing part 9.

Second Embodiment

A second embodiment will be described with reference to FIGS. 10 to 13.

In a battery cover 101 according to the present embodiment, a projection 105 is provided on a main body 5, which includes a sliding surface 103 that slides on a locking projection 11 to guide the locking projection 11 to a contact portion 19 when an opening/closing part 9 is opened with respect to the main body 5 and regulates sliding of the locking projection 11 on a flat portion 21.

The projection 105 is formed on an abutting rib 17.

Besides, a contact surface 109 is provided on the main body 5, which abuts on a contact object surface 107 formed on the opening/closing part 9 in the state where the locking projection 11 and a locking recess 15 are engaged with each other, and maintains an opening state of the opening/closing part 9 with respect to the main body 5.

Note that configurations similar to those in the first embodiment are denoted by the same reference signs, and descriptions of the configurations and functions will be omitted to refer to the first embodiment. However, same effects can be obtained as the configurations same as those in the first embodiment are adopted.

As illustrated in FIGS. 10 to 13, on the abutting rib 17 of the main body 5, the projection 105 is formed using a member continuous with the abutting rib 17 from the flat portion 21 of the contact portion 19 upwardly.

The sliding surface 103 is formed on the side surface of the projection 105 on the side of the flat portion 21, and the contact surface 109 is formed on the top of the projection 105.

The sliding surface 103 is formed on the side surface of the projection 105 on the side of the flat portion 21, which is formed from the flat portion 21 upwardly to be continuous with the flat portion 21.

The sliding surface 103 is positioned on the rotation path of the locking projection 11 drawn by the opening/closing operation of the opening/closing part 9, and slides on the locking projection 11 to guide the locking projection 11 toward the flat portion 21 when the opening/closing part 9 is opened with respect to the main body 5.

When the locking projection 11 guided to the flat portion 21 by the sliding surface 103 abuts on the flat portion 21, the sliding surface 103 is positioned outside the rotation path of the locking projection 11.

Accordingly, even if the locking projection 11 slides on the flat portion 21 toward the outside of the rotation path of the locking projection 11, movement of the locking projection 11 is regulated by the sliding surface 103 so that the contact position between the locking projection 11 and the flat portion 21 does not deviate, whereby the locking projection 11 and the flat portion 21 can be stably brought into contact with each other.

The locking projection 11 guided to the contact portion 19 having the flat portion 21 by the sliding surface 103, in which the sliding on the flat portion 21 is regulated, abuts on the flat portion 21 according to the opening operation of the opening/closing part 9, and then a contact tapered portion 23 of the contact portion 19 and a projecting tapered portion 25 of the locking projection 11 are engaged with each other.

In the present embodiment, the projecting tapered portion 25 of the locking projection 11 is inclined to spread from the distal end side of the locking projection 11 toward the base end side, which is annularly formed to be continuous in the circumferential direction of the locking projection 11.

By the contact tapered portion 23 of the contact portion 19 and the projecting tapered portion 25 of the locking projection 11 being engaged with each other, the flexible rib 13 deflects according to the opening operation of the opening/closing part 9, and the locking projection 11 and the locking recess 15 are engaged with each other when the locking projection 11 is positioned at the locking recess 15, thereby maintaining the opening state of the opening/closing part 9 with respect to the main body 5.

In the state where the opening/closing part 9 is opened with respect to the main body 5, the contact object surface 107 of the opening/closing part 9 and the contact surface 109 of the projection 105 are brought into contact with each other.

The contact object surface 107 is formed on the base end side of the flexible rib 13 of the opening/closing part 9 to be in a planar shape, which abuts on the contact surface 109 of the projection 105 in the state where the opening/closing part 9 is completely opened with respect to the main body 5, that is, in the state where the locking projection 11 and the locking recess 15 are engaged with each other.

The contact surface 109 is formed on the top of the projection 105, which abuts on the contact object surface 107 of the opening/closing part 9 in the state where the opening/closing part 9 is completely opened with respect to the main body 5 to restrict further opening of the opening/closing part 9 with respect to the main body 5.

In this manner, the contact surface 109 abuts on the contact object surface 107 of the opening/closing part 9 in the state where the opening/closing part 9 is completely opened with respect to the main body 5, whereby the opening state of the opening/closing part 9 with respect to the main body 5 can be stably maintained.

By providing the projection 105 having the sliding surface 103 and the contact surface 109 on the abutting rib 17, the function of the contact portion 19 and the function of the projection 105 can be collected in one part in the main body 5, whereby complication of the structure of the battery cover 101 can be suppressed.

In such a battery cover 101, the projection 105 having the sliding surface 103 that slides on the locking projection 11 to guide the locking projection 11 to the contact portion 19 when the opening/closing part 9 is opened with respect to the main body 5 and regulates sliding of the locking projection 11 on the flat portion 21 is provided on the main body 5 so that the locking projection 11 is stably guided to the contact portion 19 and the sliding of the locking projection 11 on the flat portion 21 is regulated, whereby the locking projection 11 and the locking recess 15 can be more reliably engaged with each other.

Besides, since the projection 105 is formed on the abutting rib 17, the projection 105 and the abutting rib 17 can be collectively arranged with respect to the main body 5, whereby complication of the structure can be suppressed.

Further, the contact surface 109 that abuts on the contact object surface 107 formed on the opening/closing part 9 in the state where the locking projection 11 and the locking recess 15 are engaged with each other and maintains the opening state of the opening/closing part 9 with respect to the main body 5 is provided on the main body 5, whereby the opening state of the opening/closing part 9 can be stably maintained.

Note that, although the flexible ribs and the abutting ribs are provided at two locations in the battery cover according to the embodiment of the present invention, it is not limited thereto, and the flexible ribs and the abutting ribs may be provided at three or more locations.

Further, although the projection is formed on the abutting rib, it is not limited thereto, and the projection may be formed at any part of the main body as long as the locking projection is guided to the contact portion and sliding of the locking projection on the flat portion can be regulated.

Furthermore, although the contact surface is formed on the projection, it is not limited thereto, and the contact surface and the contact object surface may be formed at any part of the main body and the opening/closing part as long as it can abut on the contact object surface of the opening/closing part and can maintain the opening state of the opening/closing part with respect to the main body in the state where the locking projection and the locking recess are engaged with each other.

The present application claims priority based on Japanese patent application No. 2018-046384 filed on Mar. 14, 2018 and Japanese patent application No. 2018-227297 filed on Dec. 4, 2018, and the entire contents of those applications are incorporated herein by reference.

According to the present invention, a battery cover capable of stably maintaining an opening state of an opening/closing part can be provided.

REFERENCE SIGNS LIST 1, 101 battery cover
3 battery
5 main body
7 hinge
9 opening/closing part
11 locking projection
13 flexible rib
15 locking recess
17 abutting rib
19 contact portion
21 flat portion
23 contact tapered portion
25 projecting tapered portion
103 sliding surface
105 projection
107 contact object surface
109 contact surface

What is claimed is:

1. A battery cover comprising:
a main body to be assembled to a battery;
an opening/closing part provided on the main body via a hinge, the opening/closing part being openable and closable;
a flexible rib provided on the opening/closing part to be deflectable, the flexible rib having a locking projection;
an abutting rib provided on the main body, the abutting rib having a locking recess to be engaged with the locking projection in a state where the opening/closing part is opened with respect to the main body;
a contact portion that abuts on the locking projection and deflects the flexible rib at a time when the opening/closing part is opened with respect to the main body, the contact portion being provided on the abutting rib; and
a flat portion that abuts on the locking projection at the time when the opening/closing part is opened with respect to the main body, and extends in a direction orthogonal to a direction of force input at a time that the flat portion first abuts on the locking projection, the flat portion being provided on the contact portion.

2. The battery cover according to claim 1, wherein
the contact portion includes a contact tapered portion that is formed to be inclined between the flat portion and the locking recess and slides on the locking projection at the time when the opening/closing part is opened with respect to the main body.

3. The battery cover according to claim 2, wherein
a projecting tapered portion that abuts on the contact tapered portion at a time when the locking projection and the flat portion are brought into contact with each other is formed on a side of the contact portion of the locking projection.

4. The battery cover according to claim 1, wherein
a projection having a sliding surface that slides on the locking projection to guide the locking projection to the contact portion and regulates sliding of the locking projection on the flat portion at the time when the opening/closing part is opened with respect to the main body is formed on the main body.

5. The battery cover according to claim 4, wherein
the projection is formed on the abutting rib.

6. The battery cover according to claim 1, wherein
a contact surface that abuts on a contact object surface formed on the opening/closing part and maintains an opening state of the opening/closing part with respect to the main body in a state where the locking projection and the locking recess are engaged with each other is formed on the main body.

* * * * *